Feb. 13, 1940.  P. L. CIACCIO ET AL  2,190,147
RENEW SEAT FOR TANK DISCHARGE VALVES
Filed Aug. 31, 1938
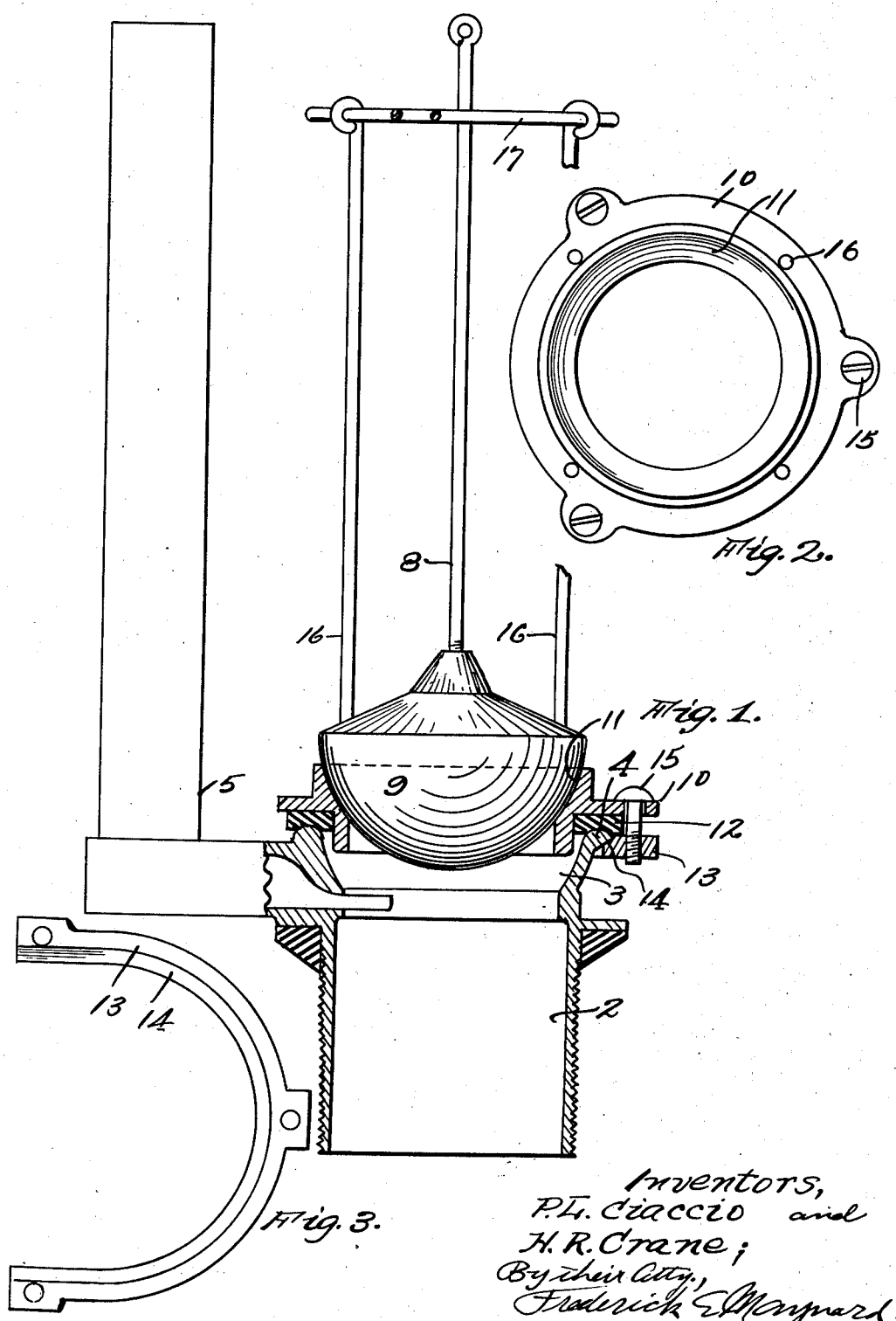

Patented Feb. 13, 1940

2,190,147

UNITED STATES PATENT OFFICE 2,190,147

RENEW SEAT FOR TANK DISCHARGE VALVES

Peter L. Ciaccio and Hubert R. Crane, Los Angeles, Calif.

Application August 31, 1938, Serial No. 227,752

5 Claims. (Cl. 4—57)

This invention is a re-new seat device for tank valve outlets.

It often happens that flush tank valve seats become unduly pitted or corroded to such an extent that the rubber ball or valve thereof will not efficiently close on the face of the seat. Attempts are made to re-polish the seat face for longer service. If the seat cannot be salvaged the plumber tears out the whole assembly from the tank and installs a new valve guide and seat unit. The cost of this is so great that the house-wife or property owner raises a great cry of overcharge without giving consideration to the fact that much time and labor are expended in the job.

An object of this invention is to provide a simple, practical, substantial, durable, easily installed jury- or re-new seat ring whereby to eliminate re-polishing of the old seat and to avoid its entire removal from the water tank.

Further an object is to provide a low-cost re-new seat that may be installed by any average individual in a few moments of time, and which is designed, constructed and intended to be directly attached to an original flush tank valve seat unit.

Also, an object is to provide an improved valve stem support and guide to provide for the more reliable action in the automatic seating of the valve irrespective of the slant of the stem of the valve in a very great annular range within a rest ring or support; a purpose being to eliminate the usual axial eye-guide commonly positioned over the vertical center of the valve seat.

The invention consists in certain advancements in this art as set forth in the ensuing disclosure and having, with the above, additional objects and advantages as hereinafter developed, and whose constructions, combinations, and details of means, and the manner of operation will be made manifest in the description of the herewith illustrative apparatus; it being understood that modifications, variations and adaptations may be resorted to within the scope, spirit and principle of the invention as it is more directly claimed hereinbelow.

Figure 1 is an elevational section showing the re-new seat as attached to a complementary tank seat unit.

Figure 2 is a plan of the re-new seat device.

Figure 3 is a top plan of the lower, seat clamp yoke of the device.

Conventional, water tank, flush valve assemblies include a down-throat 2 at the upper end of which there is a ball seating ring 3 commonly with an out-turned lip 4. To one side of the ring 3 is the usual over-flow, stand pipe 5, on which is adjustable a bracket having an eye-guide axially above the center of the ring 3 for the purpose of guiding the stem 8 of a ball valve 9 designed to float down on the discharging water and finally close on the seat ring 3. This eye-guide forms no part of the present invention and is not here shown; an object being to eliminate the guide because of defective operation, since if the guide is not positively fixed in a position over the center of the outlet ring 3, the ball valve 9 closes or seats off-center and will not shut off discharge.

The present invention includes a re-new device having an upper full circle ring or seat element 10 presenting a concave face 11 to receive the bottom surface of the ball valve 9, and the lower face of the seat element 10 is provided with a suitable rubber gasket 12 to engage downwardly on the rim or edge of the seat lip 4 to form a seal therewith. Means are provided to securely attach the re-new seat element 10 to the installed seat ring 3 easily and without dismantling any of the installed assembly.

The attaching means includes a yoke member 13 having an upper concave seat face or corner 14 to snugly fit up against the adjacent, complementary lower edge of the lip 4 of the main seat ring 3, as clearly shown in Fig. 1; the open side of the yoke 13 being sufficient to readily straddle the sides of the ring 3.

The yoke 13 and the re-new ring element 10 are connected in suitably spaced relation by a set of clamp screws 15 whereby to firmly draw the re-new ring 10 down on the gasket 12 when the clinching yoke 13 has been assembled under the ring lip 4.

A further feature of the invention resides in providing the re-new ring or seat element 10 with an upstanding set of vertical cage bars 16 within which the ball valve 9 may freely rise and fall; the upper ends of the bars being attached to a guard ring 17 at a plane below the upper end of the valve stem 8 when the valve is in lowest or seated position. It will be seen that the free ball 9 may freely rotate and may have a great degree of angular tilt of its stem 8 in the cage guard in any direction around its center and yet the ball will take an efficient closed position on its re-new seat ring 10.

What is claimed is:

1. A re-new, supplemental seat device for valve seats having an exterior, peripheral seat lip comprising a seat ring element to fit on an original valve seat, and a means to engage the seat lip for clamping the element thereto.

2. A supplemental jury-seat ring and clamp means adapted to embrace and fasten it to the rim lip of an original worn, given valve seat.

3. A supplemental jury-seat ring, a yoke member to circumferentially embrace an exterior lip of a given valve seat, and means for clamping the ring and the yoke in assembled position on the seat.

4. A flush tank valve seat re-new including a jury-ring to fit the worn original seat, and clamp means to embrace a top rim portion of the seat and secure the jury-ring thereto.

5. A supplemental, re-new, tank valve seat ring adapted to be superposed on an original worn seat, and means wholly exterior of the path of flow of fluid through the ring, and the engaged seat when applied thereto, constructed, arranged and adapted for attachment to a part of the valve seat exterior of its flow passage for securing the re-new ring to the worn original.

PETER L. CIACCIO.
HUBERT R. CRANE.